United States Patent [19]
Susman

[11] 3,864,313
[45] Feb. 4, 1975

[54] LATENT CURING AGENT FOR ISOCYANATE TERMINATED PREPOLYMERS

[75] Inventor: Samuel Eugene Susman, Norwalk, Conn.

[73] Assignee: American Cyanamid Company, Stamford, Conn.

[22] Filed: July 10, 1974

[21] Appl. No.: 487,418

[52] U.S. Cl.... 260/75 NC, 260/2.5 AC, 260/77.5 AC, 260/551 C
[51] Int. Cl............................................. C08g 22/36
[58] Field of Search.. 260/2.5 AC, 75 NC, 77.5 AC, 260/551 C

[56] References Cited
UNITED STATES PATENTS
3,645,924  2/1972  Fogiel............................. 260/75 NC
3,740,377  6/1973  Huffman et al................ 260/75 NC FOREIGN PATENTS OR APPLICATIONS
631,878  3/1947  Great Britain................. 260/551 C

*Primary Examiner*—H.S. Cockeram
*Attorney, Agent, or Firm*—Frank M. Van Riet

[57] ABSTRACT

A novel composition comprising a polyurethane prepolymer having at least difunctionality in admixture with 1,1-dimethyl-3-cyanoguanidine which is storage stable and which cures rapidly to a tough, cross-linked polyurethane polymer, a method for the production thereof and the cured polymer per se, are disclosed.

7 Claims, No Drawings

LATENT CURING AGENT FOR ISOCYANATE TERMINATED PREPOLYMERS

BACKGROUND OF THE INVENTION

The use of various amine curing agents in conjunction with urethane prepolymers is well known in the art. Although most of these curing agents perform satisfactorily within a period of time which is satisfactory to the ultimate consumer, in many instances the consumer requires not only a curing agent which will cure the polyurethane prepolymer very rapidly but one which may be premixed with the prepolymer for an extensive period of time prior to the ultimate curing of the prepolymer by the application of heat thereto.

U.S. Pat. No. 3,726,835 is exemplary of the prior art curing systems which, although they produce a storage-stable prepolymer in admixture therewith, require an extensively long period of time to cure the prepolymer into an acceptable product. This patent teaches the use of such curing agents as dicyandiamide, melamine and mixtures thereof while U.S. Pat. No. 3,734,868 teaches the use of benzoguanidine as a curing agent for such prepolymers.

These prior art curing agents, as mentioned above, are satisfactory except for the length of time required to produce a tough, cross-linked urethane polymer. As a result, the discovery of a curing agent which performs as well as or better than the known curing agents with regard to their ability to be premixed with the prepolymers prior to heat activation thereof in a stable manner but which cure the prepolymer into a cross-linked polymer at a more rapid rate which satisfies a long felt need.

SUMMARY

The novel compositions of the present invention satisfy the above mentioned requirements of premix stability and also cure at a much more rapid rate than those systems of the prior art. Therefore my compositions provide a one package, premixed system wherein the consumer need not bear the burden of improper mixing of the prepolymer and the curing agent and can obtain the beneficial result of having the resin cure at a more rapid rate to thereby increase the number of units which may be produced over a given period of time with the resultant adhesive system.

BRIEF DESCRIPTION OF THE INVENTION INCLUDING PREFERRRED EMBODIMENTS

As is mentioned briefly above, I have now discovered that isocyanate-terminated, polyester or polyether based polyol urethane prepolymers may be premixed with 1,1-dimethyl-3-cyanoguanidine as a latent curing agent to form a room temperature storageable, heat-curable polyurethane prepolymer composition which finds use in its cured condition as an adhesive, coating or the like. The prepolymer containing 1,1-dimethyl-3-guanidine need only be heat activated after its application in any desired manner and a cured product results, the curing of which is at a very rapid rate as compared to previously utilized systems.

The 1,1-dimethyl-3-guanidine compound need only be added to the urethane prepolymer in an amount which will enable curing of the prepolymer at a temperature to which the admixture is heated. I have found that from about 2-25 parts of 1,1-dimethyl-3-guanidine to 100 parts of the prepolymer may be utilized and results in a composition which is storage-stable for at least three months at room temperature without curing but which may be cured when heated to a temperature of at least about 200°F. into a tough polyurethane polymer.

The prepolymers which may be utilized to produce the novel compositions of the instant invention, as mentioned above, are the polyester or polyether based polyol urethane prepolymers which are prepared by reacting the polyol with the appropriate diisocyanate under known conditions in order to produce a prepolymer which is at least di-functional. I have found that the functionality of the prepolymer is critical and that if the prepolymer is not at least about di-functional, inferior compositions are produced. The functionality can be imparted to the prepolymer in any manner known to the art such as by reacting a polyisocyanate with a diol; reacting a diisocyanate with a polyol; blending difunctional isocyanate-terminated prepolymers with polyfunctional isocyanate-terminated prepolymers and the like.

The polyols of the polyester type may be utilized in producing the prepolymers useful herein, are well known to those skilled in the art and generally consist of those produced by reacting such materials as polypropylene oxide, polytetramethylene glycol and adipic acid; ethylene glycol, propylene glycol and adipic acid; those produced from castor oil and the like with those set forth in U.S. Pat. No. 3,264,236 being exemplary.

Polyether polyols useful herein include the polyethylene glycol based polyethers, the polypropylene glycol based polyethers and the like including mixtures of ethylene and propylene oxide and glycol derived polyethers well known in the art.

Any known polyisocyanate can be utilized to react with the above polyols to prepare the prepolymers useful herein. Those which have been found suitable include arylene polyisocyanates such as tolylene, meta-phenylene, 4-chloro-phenylene-1,3-, methylene-bis-phenylene, biphenylene-4,4'-, diisocyanates, triphenylmethane triisocyanate, alkylene diisocyanates and the like with toluene diisocyanate being that preferred and those set forth in the above mentioned U.S. Pat. No. 3,726,835, hereby incorporated herein by reference, being exemplary.

The novel compositions of the present invention may readily be cured by heating them at a temperature of at least 200°F. for from about 5-60 minutes. It is preferred, however, that the curing be conducted at a temperature of at least about 250°F. in that, at this temperature, curing occurs more rapidly. The novel compositions described herein upon heating undergo a relation during the first period of curing and then are formed into hard, cross-linked, tough polymers of a deep yellow color after final cure has been accomplished.

The following examples are set forth for purposes of illustration only and are not to be construed as limitations on the instant invention except as set forth in the appended claims. All parts are by weight unless otherwise specified.

EXAMPLE 1

To a suitable reaction vessel are added 100 parts of a methylene-bis-phenylene diisocyanate-terminated polyester based polyol prepolymer and 10 parts of 1,1-dimethyl-3-cyanoguanidine. The resultant admixture is separated into two equal quantities and the first is heated to 300°F. The composition gells in 5 minutes and cures to a tough, cross-linked polymer in 10 minutes. The other portion of the admixture is stored at room temperature and shows no evidence of curing after 68 days.

The same prepolymer system containing 10 parts of cyanoguanidine remains liquid after heating to 300°F. after 5 minutes, forms a gel after 10 minutes and cures to a hard polymer in 20–30 minutes.

When 1,1-dimethyl-3-cyanoguanidine utilized above is replaced by 1-phenyl-3-cyanoguanidine, 1-methyl-3-cyanoguanidine or 1,1-diethyl-3-cyanoguanidine, the resultant admixture, upon heating to 300°F. gels in 10–15 minutes and cures to a hard polymer in 15–30 minutes.

EXAMPLE 2

100 Parts of a commercially available tri-functional polyol prepolymer terminated with toluene diisocyanate is mixed with 10 parts of 1,1-dimethyl-3-cyanoguanidine. A second 100 parts of the same polyol are then mixed with 10 parts of 3-cyanoguanidine. The two mixtures are heated to 300°F. The 1,1-dimethyl-3-cyanoguanidine system sets in 10 minutes while the 3-cyanoguanidine system sets in 15 minutes.

At 275°F. a similar 1,1-dimethyl-3-cyanoguanidine system begins to evident signs of reaction (characteristically yellow color develops) after 5 minutes, gels in 10 minutes and is firm in 20 minutes. A similar 3-cyanoguanidine system produces a soft gel in 15 minutes and is firm in 20 minutes at 275°F.

EXAMPLE 3

The polyurethane prepolymer of Example 1 is again mixed at a ratio of 10:1, respectively, with 1,1-dimethyl-3-cyanoguanidine. The admixture is heated to 275°F. In 10 minutes the admixture becomes viscous, produces a soft gel in 15 minutes, a tight gel in 20 minutes and is firm in 30 minutes.

When the 1,1-dimethyl-3-cyanoguanidine is replaced by 3-cyanoguanidine, the resultant composition, upon heating to 275°F., is still liquid after 30 minutes, becomes viscous after 35 minutes, gels in 40 minutes, is a tight gel in 55 minutes and is firm in 60 minutes.

EXAMPLE 4

The two compositions prepared in Example 3 are again prepared and the resultant compositions are heated to 250°F. The results of this heating are set forth in Table I, below.

TABLE I

| Time | 1,1-Dimethyl-3-Cyanoguanidine | 3-Cyanoguanidine |
|---|---|---|
| 15 mins. | turns yellow | liquid |
| 30 mins. | gels | liquid |
| 45 mins. | tight gel | liquid |
| 60 mins. | firm polymer | liquid |
| 90 mins. | firm polymer | very viscous |
| 105 mins. | firm polymer | surface gel |
| 120 mins. | firm polymer | soft gel |
| 150 mins. | firm polymer | tight gel |
| 195 mins. | firm polymer | firm polymer |

EXAMPLE 5

The procedure of Example 1 is again followed except that the prepolymer is polyether based. The polyurethane prepolymer cures at 300°F. in 12 minutes with 1,1-dimethyl-3-cyanoguanidine as the curing agent.

When cyanoguanidine; 1-phenyl-cyanoguanidine; 1-methyl-3-cyanoguanidine and 1,1-diethyl-3-cyanoguanidine are used, individually, to replace the 1,1-dimethyl-3-cyanoguanidine, at identical concentrations and at equal temperatures, the resultant prepolymers cure in 18–34 minutes.

I claim:

1. A heat-curable, storage-stable composition of matter comprising an isocyanate-terminated polyester or polyether based polyol urethane prepolymer of at least difunctionality in admixture with a curing amount of 1,1-dimethyl-3-cyanoguanidine.

2. A composition of matter according to claim 1 wherein said urethane prepolymer is polyester based.

3. A composition of matter according to claim 1 wherein said urethane prepolymer is polyether based.

4. A method for producing a tough, abrasion-resistant polyurethane polymer which comprises admixing an isocyanate-terminated polyester or polyether based polyol urethane prepolymer of at least difunctionality with a curing amount of 1,1-dimethyl-3-cyanoguanidine, heating said mixture to a temperature of at least 200°F. for 5–60 minutes and recovering the resultant cured polyurethane polymer.

5. A method according to claim 4 wherein said prepolymer is polyester based.

6. A method according to claim 4 wherein said prepolymer is polyether based.

7. A composition of matter comprising the cured polyurethane polymer produced by the process of claim 4.

* * * * *